US 8,149,664 B2

(12) United States Patent
Park

(10) Patent No.: US 8,149,664 B2
(45) Date of Patent: Apr. 3, 2012

(54) METHOD AND APPARATUS FOR RECORDING DATA ON WRITE-ONCE RECORDING MEDIUM

(75) Inventor: Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1229 days.

(21) Appl. No.: 11/083,312

(22) Filed: Mar. 18, 2005

(65) Prior Publication Data

US 2005/0207305 A1    Sep. 22, 2005

Related U.S. Application Data

(60) Provisional application No. 60/554,348, filed on Mar. 19, 2004.

(30) Foreign Application Priority Data

May 3, 2004    (KR) .................. 10-2004-0031020

(51) Int. Cl.
G11B 7/00    (2006.01)
(52) U.S. Cl. ............... 369/53.17; 369/30.09; 369/47.22; 369/53.12; 369/30.08; 369/30.37
(58) Field of Classification Search ............. 369/53.29, 369/53.17, 47.14, 44.32, 44.33, 53.12, 53.42, 369/280, 30.07–30.09, 30.37, 47.22
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi | |
| 4,807,205 A | 2/1989 | Picard | |
| 4,963,866 A | 10/1990 | Duncan | |
| 5,068,842 A | 11/1991 | Naito | |
| 5,111,444 A | 5/1992 | Fukushima et al. | |
| 5,210,734 A | 5/1993 | Sakurai | |
| 5,235,585 A | 8/1993 | Bish et al. | |
| 5,237,553 A | 8/1993 | Fukushima et al. | |

(Continued)

FOREIGN PATENT DOCUMENTS

CN    1134017    10/1996

(Continued)

OTHER PUBLICATIONS

International Search Report dated Nov. 3, 2005.

(Continued)

*Primary Examiner* — Wayne Young
*Assistant Examiner* — Dionne Pendleton
(74) *Attorney, Agent, or Firm* — Harness, Dickey & Pierce, P.L.C.

(57) ABSTRACT

A method and apparatus for recording data on a write-once recording medium are disclosed. In the write-once recording medium, the method includes, when a defect area is detected in the recording medium, deciding a replacement recording method for replacing the defect area, when the detected defect area is replacement recorded in a spare area, recording a position information of the defect area and a position information of the spare area in a temporary management area as a defect management information, and when the detected defect area is skipped and the data is replacement recorded in a next consecutive area, an information indicating that the skipped area is the defect area is recorded in a temporary management area as a defect management information. Thus, the write-once recording medium may be managed with more efficiency and data may be efficiently recorded on the recording medium.

11 Claims, 9 Drawing Sheets

U.S. PATENT DOCUMENTS

| | | | |
|---|---|---|---|
| 5,247,494 A | 9/1993 | Ohno et al. | |
| 5,319,626 A | 6/1994 | Ozaki et al. | |
| 5,404,357 A | 4/1995 | Ito et al. | |
| 5,442,611 A | 8/1995 | Hosaka | |
| 5,448,728 A | 9/1995 | Takano et al. | |
| 5,475,820 A | 12/1995 | Natrasevschi et al. | |
| 5,481,519 A | 1/1996 | Hosoya | |
| 5,495,466 A | 2/1996 | Dohmeier et al. | |
| 5,528,571 A | 6/1996 | Funahashi et al. | |
| 5,553,045 A | 9/1996 | Obata | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori | |
| 5,802,028 A | 9/1998 | Igarashi | |
| 5,805,536 A | 9/1998 | Gage et al. | |
| 5,848,038 A | 12/1998 | Igarashi | |
| 5,867,455 A | 2/1999 | Miyamoto et al. | |
| 5,878,020 A | 3/1999 | Takahashi | |
| 5,914,928 A | 6/1999 | Takahashi | |
| 5,966,358 A * | 10/1999 | Mine | 369/47.14 |
| 6,058,085 A | 5/2000 | Obata | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,212,647 B1 * | 4/2001 | Sims et al. | 714/8 |
| 6,233,654 B1 | 5/2001 | Aoki et al. | |
| 6,292,445 B1 | 9/2001 | Ito et al. | |
| 6,336,202 B1 * | 1/2002 | Tsuchimoto et al. | 714/768 |
| 6,341,109 B1 | 1/2002 | Kayanuma | |
| 6,341,278 B1 | 1/2002 | Yamamoto et al. | |
| 6,373,800 B1 | 4/2002 | Takahashi | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko | |
| 6,469,978 B1 | 10/2002 | Ohata et al. | |
| 6,477,126 B1 | 11/2002 | Park et al. | |
| 6,480,446 B1 | 11/2002 | Ko | |
| 6,493,301 B1 | 12/2002 | Park | |
| 6,529,458 B1 | 3/2003 | Shin | |
| 6,542,450 B1 | 4/2003 | Park | |
| 6,564,345 B1 | 5/2003 | Kim et al. | |
| 6,581,167 B1 | 6/2003 | Gotoh et al. | |
| 6,594,209 B2 | 7/2003 | Ijtsma et al. | |
| 6,606,285 B1 | 8/2003 | Ijtsma et al. | |
| 6,615,363 B1 | 9/2003 | Fukasawa | |
| 6,631,106 B1 | 10/2003 | Numata et al. | |
| 6,633,724 B1 | 10/2003 | Hasegawa et al. | |
| 6,667,939 B1 | 12/2003 | Miyamoto | |
| 6,671,243 B2 * | 12/2003 | Ando et al. | 369/59.1 |
| 6,671,249 B2 | 12/2003 | Horie | |
| 6,697,306 B2 | 2/2004 | Sako | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B2 | 7/2004 | Hirayama | |
| 6,766,418 B1 | 7/2004 | Alexander et al. | |
| 6,788,631 B2 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki | |
| 6,934,236 B2 | 8/2005 | Lee et al. | |
| 6,999,398 B2 | 2/2006 | Yamamoto et al. | |
| 7,002,882 B2 * | 2/2006 | Takahashi | 369/47.14 |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0014070 A1 * | 8/2001 | Ando et al. | 369/59.25 |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi et al. | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 * | 7/2003 | Ito et al. | 369/47.14 |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0022171 A1 * | 2/2004 | Ko | 369/275.3 |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 * | 9/2004 | Ueda et al. | 369/47.14 |
| 2004/0179445 A1 | 9/2004 | Park et al. | |
| 2004/0179458 A1 | 9/2004 | Hwang et al. | |
| 2004/0223427 A1 | 11/2004 | Kim et al. | |
| 2004/0246851 A1 | 12/2004 | Hwang et al. | |
| 2004/0246852 A1 * | 12/2004 | Hwang et al. | 369/53.17 |
| 2005/0007910 A1 | 1/2005 | Ito et al. | |
| 2005/0008346 A1 | 1/2005 | Noguchi et al. | |
| 2005/0025007 A1 | 2/2005 | Park | |
| 2005/0047294 A1 | 3/2005 | Park | |
| 2005/0050402 A1 * | 3/2005 | Koda et al. | 714/42 |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0111315 A1 * | 5/2005 | Hwang et al. | 369/47.14 |
| 2005/0195716 A1 | 9/2005 | Ko et al. | |
| 2005/0207262 A1 | 9/2005 | Terada et al. | |
| 2005/0289389 A1 | 12/2005 | Yamagami et al. | |
| 2006/0077827 A1 | 4/2006 | Takahashi | |

| | | |
|---|---|---|
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2007/0294571 A1 | 12/2007 | Park et al. |
| 2008/0046780 A1 | 2/2008 | Shibuya et al. |

FOREIGN PATENT DOCUMENTS

| | | |
|---|---|---|
| CN | 1140897 | 1/1997 |
| CN | 1227950 | 9/1999 |
| CN | 1246707 | 3/2000 |
| CN | 1273419 | 11/2000 |
| CN | 1479304 | 3/2004 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 A2 | 1/1990 |
| EP | 0 472 484 | 2/1992 |
| EP | 0 477 503 | 4/1992 |
| EP | 0 556 046 | 8/1993 |
| EP | 0 464 811 | 10/1997 |
| EP | 0 871 172 | 10/1998 |
| EP | 0 908 882 | 4/1999 |
| EP | 0 997 904 | 8/1999 |
| EP | 0 974 967 | 1/2000 |
| EP | 0 989 554 | 3/2000 |
| EP | 1 026 681 | 8/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 547 065 | 11/2004 |
| EP | 1 564 740 | 8/2005 |
| EP | 1 573 723 | 9/2005 |
| EP | 1 612 790 | 1/2006 |
| EP | 1 623 422 | 2/2006 |
| GB | 2 356 735 | 5/2001 |
| JP | 63-091842 | 4/1988 |
| JP | 1-263955 | 10/1989 |
| JP | 2-023417 | 1/1990 |
| JP | 5-274814 | 10/1993 |
| JP | 6-349201 | 12/1994 |
| JP | 8-096522 | 4/1996 |
| JP | 9-145634 | 6/1997 |
| JP | 9-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-236743 | 8/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2003-536194 | 12/2003 |
| JP | 2004-280864 | 10/2004 |
| JP | 2004-280865 | 10/2004 |
| JP | 2005-004912 | 1/2005 |
| JP | 2005-535993 | 11/2005 |
| JP | 2005-538490 | 12/2005 |
| JP | 2005-538491 | 12/2005 |
| JP | 2006-519445 | 8/2006 |
| KR | 1020020081411 | 10/2002 |
| KR | 1020030067650 | 8/2003 |
| KR | 1020040009358 | 1/2004 |
| KR | 10-2004-0015602 | 2/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/079353 | 9/2003 |
| WO | WO 2004/015707 A1 | 2/2004 |
| WO | WO 2004/015708 | 2/2004 |
| WO | WO 2004/029668 | 4/2004 |
| WO | WO 2004/029941 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |

OTHER PUBLICATIONS

Search Report for corresponding European Application No. 07110035.8 dated Jun. 5, 2008.
Office Action for corresponding Russian Application No. 2006104619/28 dated Jun. 26, 2008.
Chinese Office Action dated Jun. 5, 2009.
Office Action for corresponding Korean Patent Application No. 10-2004-0031020 dated Aug. 23, 2010.
Office Action for counterpart Japanese Application No. 2007-503836 dated Jan. 26, 2010 with English translation.
Notice of Allowance for corresponding Korean Patent Application No. 10-2004-0031020 dated Feb. 22, 2011.
"JIS Handbook Data Processing for Hardware," Japanese Standards Association Inc., Japan, Apr. 21, 1999, pp. 1064-1070.
International Search Report dated Aug. 31, 2004, for corresponding International Application No. PCT/KR2004/001058 (8 pp.).
International Search Report dated Jan. 13, 2006, for corresponding International Application No. PCT/KR2005/001934 (7 pp.).
International Search Report dated Mar. 8, 2007, for corresponding International Application No. PCT/KR2006/005176 (1 p.).

* cited by examiner

METHOD AND APPARATUS FOR RECORDING DATA ON WRITE-ONCE RECORDING MEDIUM

This application claims the benefit of the Korean Application No. 10-2004-0031020, filed on May 3, 2004, which is hereby incorporated by reference as if fully set forth herein.

This application claims the benefit of the U.S. Provisional Application No. 60/554,348, filed on Mar. 19, 2004, in the name of inventors Sung Wan PARK, entitled "DEFECT MANAGEMENT OF OPTICAL DISC", which is hereby incorporated by reference as if fully set forth herein.

BACKGROUND OF THE INVENTION

1. Field of the Invention

The present invention relates to a write-once recording medium, and more particularly, to a method and apparatus for recording data on a write-once recording medium. Although the present invention is suitable for a wide scope of applications, it is particularly suitable for managing the recording medium with more efficiency and efficiently recording data on the recording medium.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, various types of standard proposals related to the blu-ray disc (BD) are under preparation and development. Also, in succession to the re-writable blu-ray disc (BD-RE), a wide range of standard proposals are under preparation for the write-once blu-ray disc (BD-WO). Most particularly, in case of the write-once blu-ray disc (BD-WO), there lies many limitations in that data can be written (or recorded) only once on a specific area of the optical disc. And, when a defect area occurs in such an optical disc, a method for managing defects would be considered to be a very critical issue in the write-once optical discs (or blu-ray discs).

Therefore, due to the 'one-time only' characteristic of recording data in the write-once optical disc, the method for recording defect management and disc usage status information and the method for managing such recorded information are much more complicated than those of the re-writable optical disc. Since a consolidated standard that can satisfy the above-described requirements is yet to be completed, an effective solution for resolving such difficulties is urgently required.

SUMMARY OF THE INVENTION

Accordingly, the present invention is directed to a method and apparatus for recording data on a write-once recording medium that substantially obviate one or more problems due to limitations and disadvantages of the related art.

An object of the present invention is to provide an effective method for recording data by categorizing the method for recording data on a write-once recording medium into a real time recording and non-real time recording.

Another object of the present invention is to provide a data recording apparatus for recording data by using the above-described recording method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a write-once recording medium, a method for recording data in the write-once recording medium includes, when a defect area is detected in the recording medium, deciding a replacement recording method for replacing the defect area, when the detected defect area is replacement recorded in a spare area, recording a position information of the defect area and a position information of the spare area in a temporary management area as a defect management information, and when the detected defect area is skipped and the data is replacement recorded in a next consecutive area, an information indicating that the skipped area is the defect area is recorded in a temporary management area as a defect management information.

In another aspect of the present invention, in a method for recording data on a write-once recording medium, a data recording method of the write-once recording medium includes when a defect area is detected while recording data on the recording medium, and when data is recorded in non real-time, performing recording by using one of a linear replacement method in a spare area and a skip replacement method skipping the defect area, when data is recorded in real-time, performing recording by using one of a stream recording method and a skip replacement method skipping the defect area, and recording a defect management information according to each recording method in a temporary management area within the recording medium.

In another aspect of the present invention, in a method for recording data on a write-once recording medium, a data recording method of the write-once recording medium includes recording data on a first open sequential recording range (SRR), and, when a defect area is detected while recording data, skipping the defect area so as to perform recording by using a skip replacement method in a next consecutive area, and when the next consecutive area is a second open sequential recording range (SRR), changing the first open SRR to a closed SRR.

In a further aspect of the present invention, an apparatus for recording data on a write-once recording medium includes a memory reading and storing a management information on the write-once recording medium, and a microcomputer controlling operations so that data is recorded in a non recording-completed area and a non-defect area through the management information stored in the memory, and so that when a defect area is detected while recording data on the recording medium, and when data is recorded in non real-time, recording is performed by using one of a linear replacement method in a spare area and a skip replacement method skipping the defect area, and when data is recorded in real-time, recording is performed by using one of a stream recording method and a skip replacement method skipping the defect area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "blu-ray disc (BD)" will be given as an example of the recording medium proposed herein. However, it will be apparent that the spirit or scope of the present invention may be equally applied to other types of recording medium.

Figure 1:
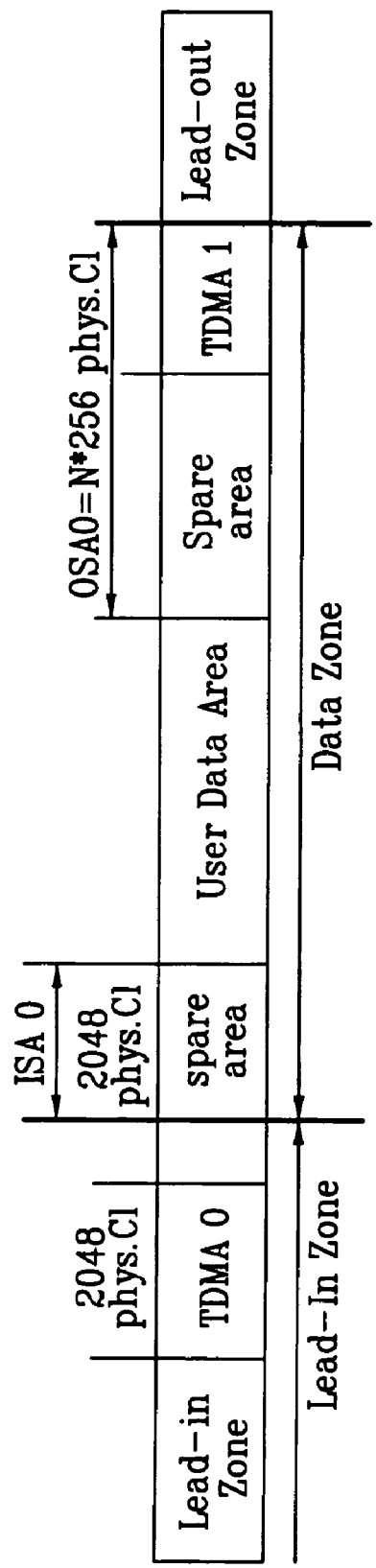
FIG. 1 illustrates a structure of a single-layer optical disc of a write-once recording medium according to the present invention.

FIG. 1 illustrates a structure of a single-layer optical disc of a write-once recording medium according to the present invention. Referring to FIG. 1, the write-once high density optical disc having a single layer structure is sectioned and designated as, starting from an inner circumference to an outer circumference, a lead-in zone, a data zone, and a lead-out zone. Whenever required, temporary disc management areas (TDMAs), wherein defect area management and recording management information are updated, are included in the lead-in zone. Herein, the TDMA existing within the lead-in zone is referred to as "TDMA 0", which is formed of a fixed size of 2048 physical clusters.

In addition, starting from the inner circumference of the disc, the data area is sectioned to have an inner spare area (hereinafter referred to as an "ISA"), a user data area, and an outer spare area (hereinafter referred to as an "OSA"). Herein, the actual user data is recorded within the user data area. The spare areas (ISA and OSA) are areas allocated during an initialization of the disc for re-allocation of defective clusters and additional TDMAs. The inner spare area (ISA) has a fixed size of 2048 physical clusters, and the outer spare area (OSA) has a variable size of N*256 physical clusters. Most particularly, "TDMA 1" may exist within the outer spare area (OSA) as an additional TDMA, wherein defect area management and recording management information are updated. Such additional TDMA and TDMA 0 are effectively used during frequent updates of management information, such as frequent ejections after short recordings.

Figure 2:
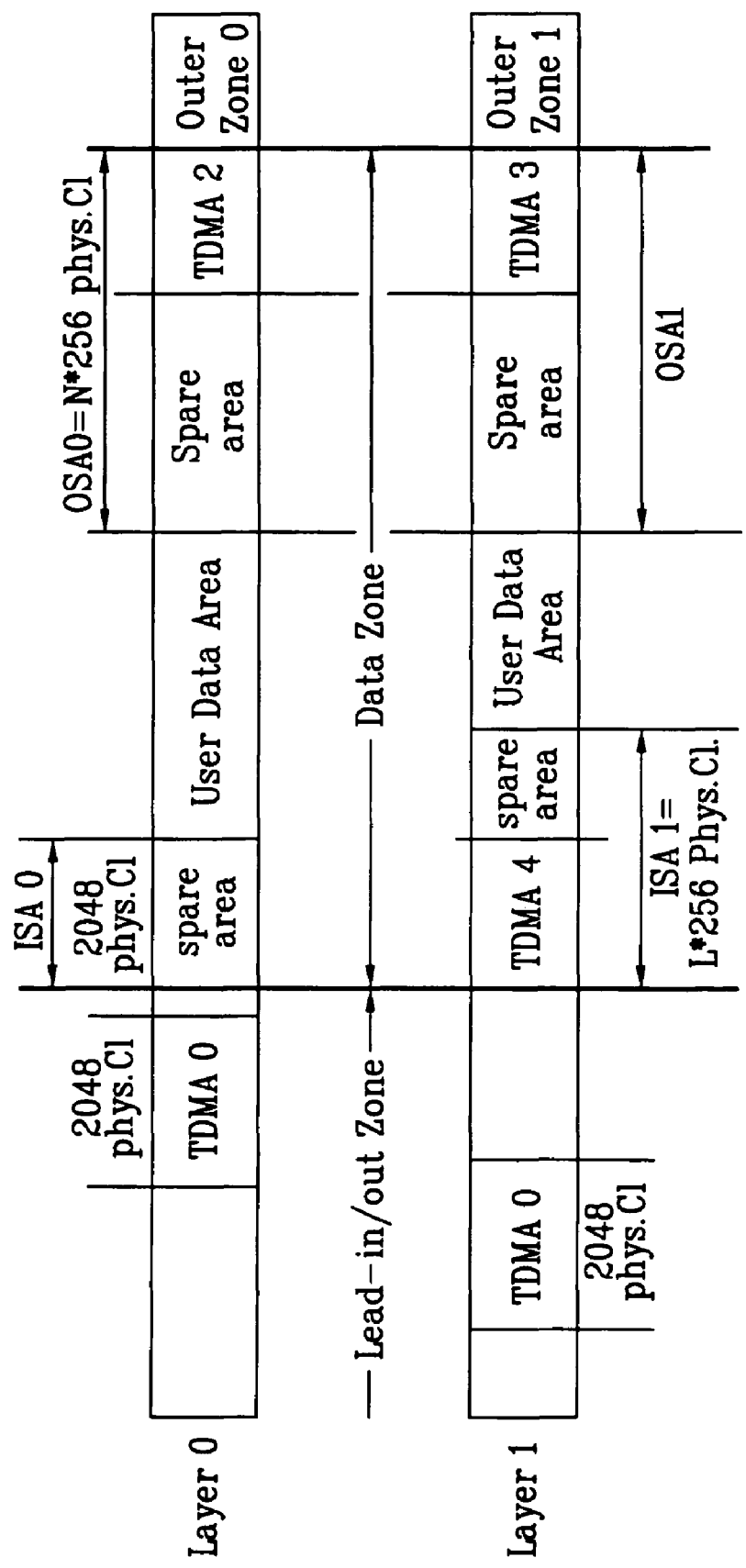
FIG. 2 illustrates a structure of a dual-layer optical disc of the write-once recording medium according to the present invention.

Meanwhile, FIG. 2 illustrates a structure of a dual-layer optical disc of the write-once recording medium according to the present invention. Referring to FIG. 2, the write-once high density optical disc having a dual-layer structure includes 2 layers (Layer 0 and Layer 1) and is sectioned and allocated as, starting from the inner circumference to the outer circumference of the optical disc, lead-in zone, lead-out zone, data zone, and outer zones 0 and 1. In the lead-in/out zones, the zone corresponding to layer 0 is the lead-in zone, and the zone corresponding to layer 1 is the lead-out zone. In the dual-layer disc having the above-described structure, the lead-in zone of layer 0 has a TDMA 0, which is similar to the single-layer optical disc described above, and the lead-out zone of layer 1 has a second TDMA, being TDMA 1. Both TDMA 0 and TDMA 1 have a fixed size of 2048 physical clusters.

Layer 0 of the data zone is sectioned and designated as, starting from the inner circumference of the disc, an inner spare area 0 (ISA 0), a user data area, and an outer spare area 0 (OSA 0). The inner spare area 0 (ISA 0) has a fixed size of 2048 physical clusters, and the outer spare area 0 (OSA 0) has a variable size of N*256 physical clusters. At this point, TDMA 2 may exist within the outer spare area 0 (OSA 0) as the additional TDMA. Herein, it is preferable TDMA 2 has a size equal to ¼ of that of the outer spare area 0 (OSA 0), which is equal to the size of N*64 physical clusters. Moreover, layer 1 of the data zone is sectioned and designated as, starting from the inner circumference of the disc, an inner spare area 1 (ISA 1), a user data area, and an outer spare area 1 (OSA 1). The inner spare area 1 (ISA 1) has a variable size of L*256 physical clusters, and the outer spare area 1 (OSA 1) has a variable size of N*256 physical clusters. At this point, TMDA 3 may exist in the outer spare area 1 (OSA 1) as the additional TDMA, and TDMA 4 may exist in the inner spare area 1 (ISA 1) as the additional TDMA. Each of TDMA 3 and TDMA 4 has the size equal to ¼ of each of the spare areas, which is equal to the size of N*64 physical clusters and L*64 physical clusters, respectively. In the dual-layer disc, the TDMAs are used in the order of TDMA 0→TDMA 1→TDMA 2→TDMA 3→TDMA 4. Also, additional TDMAs, and TDMAs 0 and 1 are effectively used during frequent updates of management information, such as frequent ejections after short recordings.

Figure 3A:
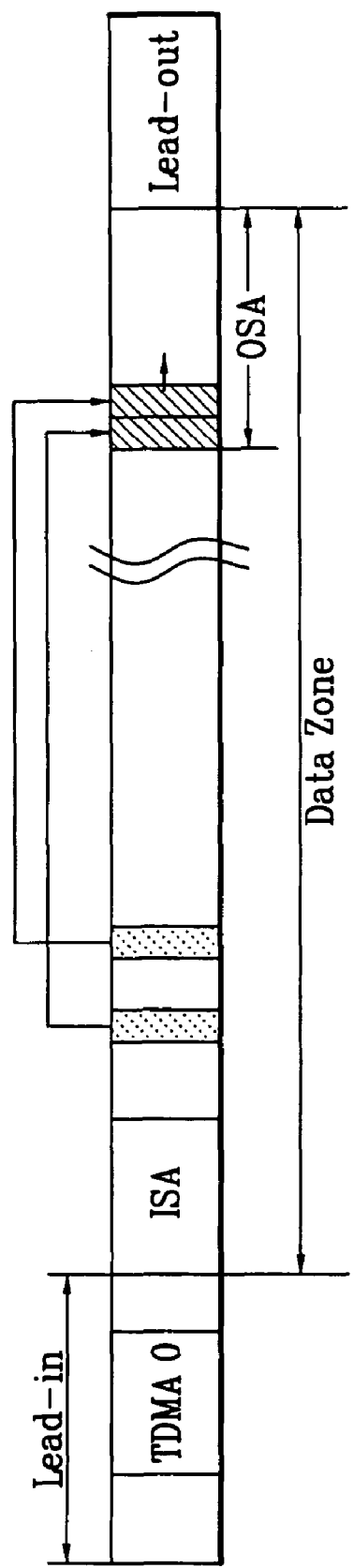
FIGS. 3A and 3B illustrate an example of managing a defect area in the write-once recording medium according to an embodiment of the present invention.
Figure 3B:
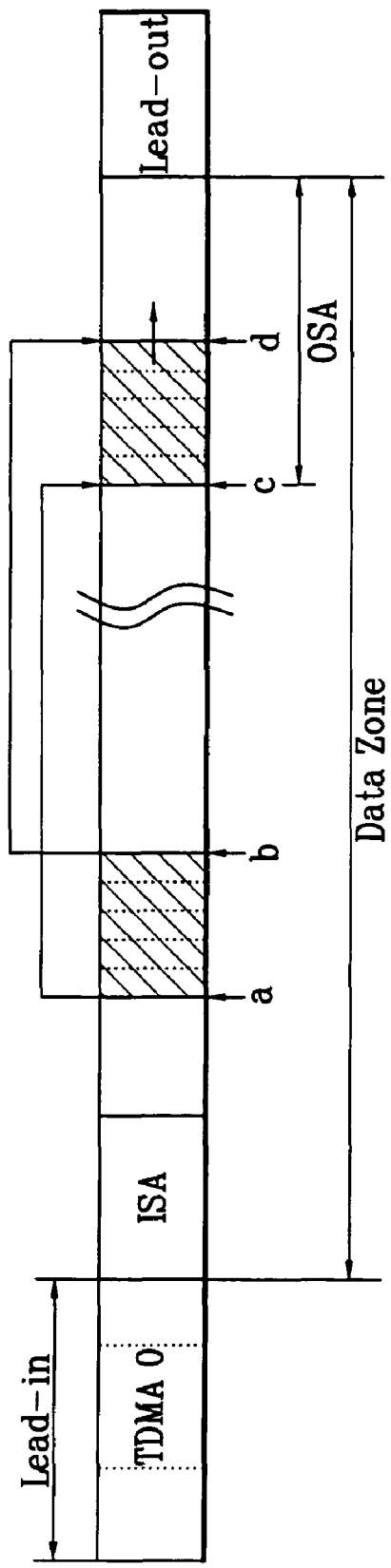

FIGS. 3A and 3B, and FIGS. 4A and 4B illustrate examples of managing defect areas, when the defect areas occurs in the optical disc having the above-described structure. FIGS. 3A and 3B illustrate an example of managing a defect area in the write-once recording medium according to an embodiment of the present invention. Most particularly, an example of replacing the data that is to be recorded on the defect area to the spare area. When using the actual write-once optical disc, a defect area may occur in a specific area within the data zone of the optical disc, wherein the actual disc is to be recorded. At this point, the defect area may physically occur in one or more clusters, due to damage or contamination on the surface of the optical disc. FIG. 3A illustrates an example of the defect area occurring in one cluster, and FIG. 3B illustrates an example of the defect area occurring in a plurality of consecutive clusters.

Referring to FIG. 3A, when a defect occurs in a single cluster, the data that is to be recorded in the defect area is replacement recorded in a spare area (ISA or OSA). More specifically, in the example given in FIG. 3A, the replacement recording is performed in the outer spare area (OSA). Recording is performed starting from the inner portion of the spare area to the direction of the lead-out zone. As described above, when the data that is to be recorded in the defect area is replacement recorded in the outer spare area (OSA), the management information of the replacement recorded data is recorded in the TDMA within the optical disc as a temporary defect list (TDFL) information, thereby completing the recording (or writing) of the data. Therefore, in an optical disc with completed recording, when a host wishes to reproduce (or read) the defect area in accordance with a user request (or command), the optical disc drive refers to the recorded management information, so as to reproduce the replacement recorded data, thereby executing the reproduction (or reading) command. The above-described defect that may occur in a single cluster, which is replacement recorded in the spare area, is referred to as a Re-allocatable defect (RAD).

Meanwhile, referring to FIG. 3B, in the example describing a defect that occurs in a plurality of consecutive clusters, the example includes defect areas that physically occur. In addition, when a plurality of neighboring clusters of a single defective cluster is liable to be damaged or contaminated, due to a setting on the optical disc drive, the example also includes simultaneously treating the plurality of neighboring clusters as a defect area, for safety measures in case the neighboring clusters are actually damaged or contaminated. As described above, when a plurality consecutive clusters within the data zone is the defect area, the data that is to be recorded in the corresponding area is replacement recorded in the spare area (ISA or OSA), as described in FIG. 3A. Most particularly, in the example given in FIG. 3B, the data is replacement recorded in area c-d of the outer spare area (OSA). At this point, recording (or writing) of the data is performed starting from the inner portion of the spare area to the direction of the lead-out zone.

As described above, when data is replacement recorded in the outer spare area, the corresponding management information is recording in the TDMA of the disc as TDFL information. Thereafter, upon reproduction (or reading), area c-d is reproduced instead of area a-b, thereby executing the reproduction (or reading) command. In the present invention, the defect occurring in the consecutive multiple clusters that are replacement recorded in the spare area is referred to as a consecutive re-allocatable defect (CRD).

Meanwhile, when a defect area occurs within the data area of the optical disc, the data that is to be recorded in the defect area may be recorded in a replacement area, as described in the embodiment shown in FIGS. 3A and 3B. However, there may also be instances where data cannot be replacement recorded due to various factors. (Such factors will be described in detail in a later process.) The instances in which data cannot be recorded in a replacement area will now be described with reference to FIGS. 4A and 4B, which illustrate an example of managing a defect area in the write-once recording medium according to another embodiment of the present invention.

Figure 4A:
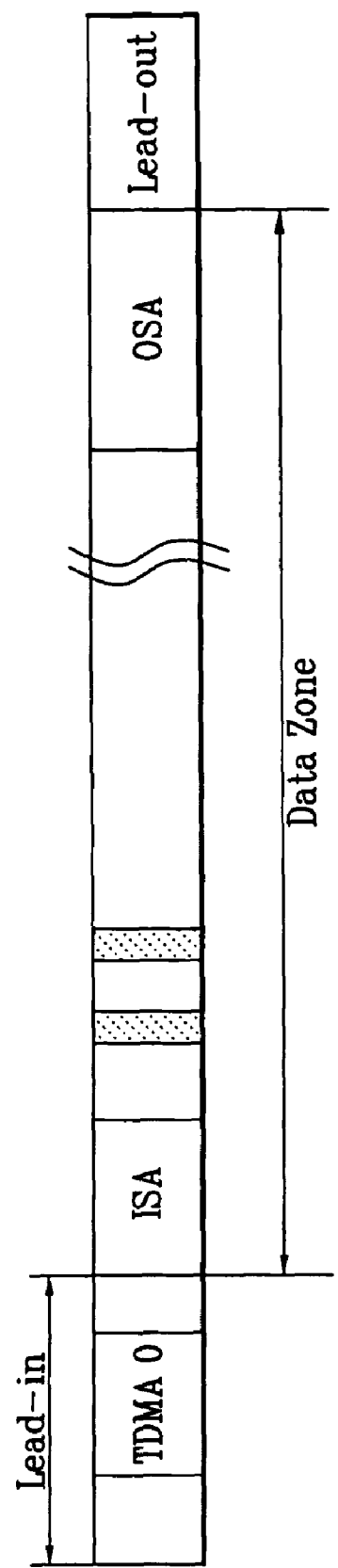
FIGS. 4A and 4B illustrate an example of managing a defect area in the write-once recording medium according to another embodiment of the present invention.
Figure 4B:
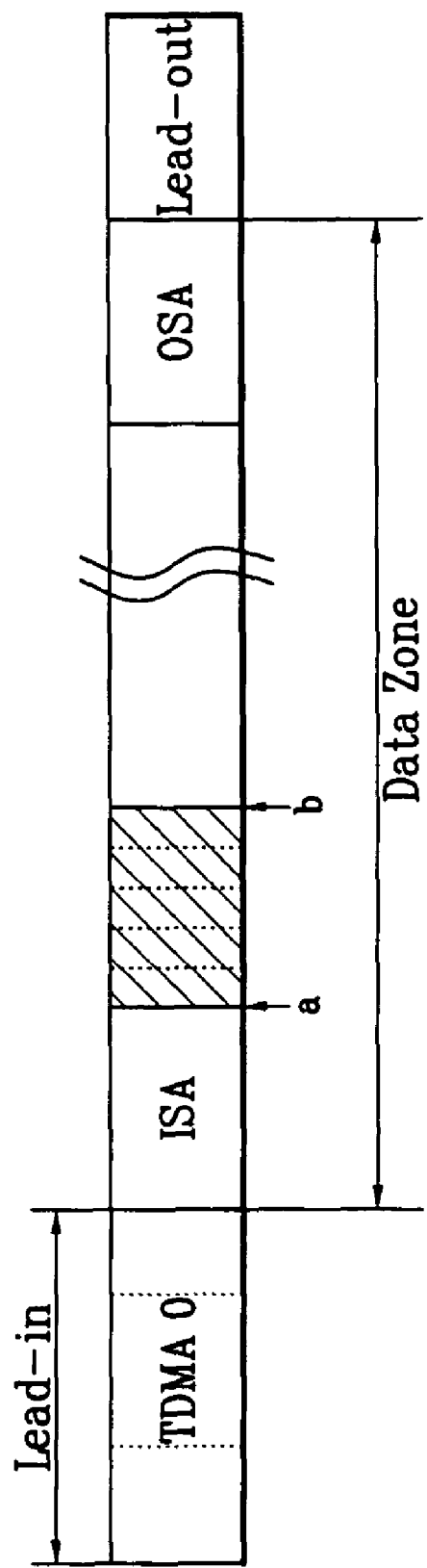

Referring to FIGS. 4A and 4B, as described above, a defect area may occur in one or more clusters due to various factors, such as damage or contamination of the surface of the optical disc. Accordingly, when such a defect area occurs, the data that is to be recorded in the defect area may be replacement recorded in a spare area. However, in some cases, such replacement recorded cannot be performed. In such instances may include, for example, real-time recording, such as broadcast programs recording, insufficient spare area for replacement recording, or prohibition of replace recording due to settings on the optical disc drive.

Therefore, when one cluster is determined to be defective (as shown in FIG. 4A) and when a plurality of consecutive clusters (or multiple clusters) is determined to be defective, the data that is to be recorded in the defect area is not replacement recorded in the spare area. Instead, a location information of the defect area is recorded as a TDFL information, which is included in the TDMA. As described above, once the location information of the defect area is recorded, when the host wishes to reproduce the defect area in accordance with the user's request in a later process, the optical disc drive may skip the defective area corresponding to the recorded location information of the defect area and proceed with the reproduction (or reading) operation. In the preset invention, when a replacement address is not allocated for a cluster, the defect is referred to as a "non-reallocatable defect (NRD)", and when a replacement address is not allocated for consecutive multiple clusters, the defect is referred to as a "consecutive non-reallocatable defect (CND)". The data recording method for such a defect area includes a non real-time recording method and a real-time recording method.

When recording data on the optical disc in non real-time, the defect area occurring on the disc can be managed. Additionally, a write-and-verify method may be used in accordance with the command of the host, so as to record the data. More specifically, after recording the data on the optical disc, a process of verifying whether the data has been properly recorded by cluster units is carried out, thereby allowing an application of the reallocatable type (RAD or CRD) of the above-described defect area. Furthermore, when recording data on the optical disc in non real-time, a skip replacement writing method skipping the defect area may also be applied. In this case, since a replacement to a spare area is not necessary, the defect management information is configured with the NRD type or the CND type. Most particularly, the skip replacement writing method can also be applied when all of the spare areas are used or when none of the spare areas is allocated.

Meanwhile, when recording data in real-time, either a stream writing method or a skip writing method is used. The stream writing method refers to a method of ignoring a defective cluster even when the recording system detects the defective cluster (or omitting the process of detecting the defective cluster) and continuously recording data on the corresponding defective cluster. On the other hand, the skip writing method refers to a method of skipping a defective cluster, when the recording system detects the defective cluster, and replacement recording the data on a cluster subsequent to the corresponding defective cluster.

At this point, when using the skip writing method in the real-time recording method, since the optical recording system does not have sufficient time to check the range of the defect area, it is preferable to skip a relatively broad area range in order to find a safe recordable area. However, information of the record starting position after skipping the defect area is managed by the file system. Meanwhile, in a sequential recording mode (SRM), which is one of the recording methods of the write-once high density optical disc, when a defect area is detected while recording data either in non real-time or in real-time, a skip writing (or skip replacement) method according to an embodiment of the present invention, wherein recording data by skipping the defect area, will now be described in detail with reference to the accompanying drawings.

Figure 5:
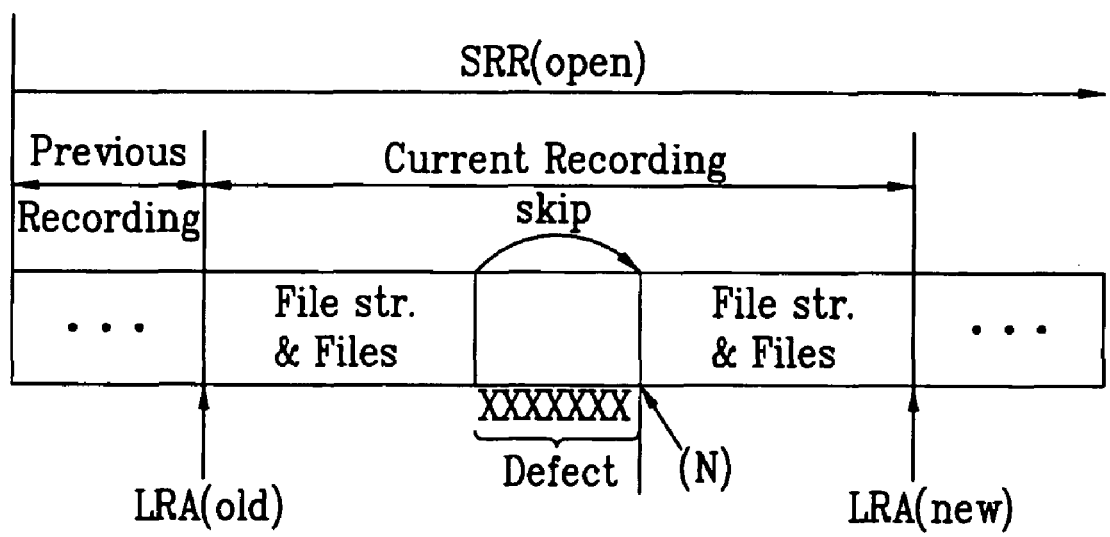
FIG. 5 illustrates a data recording method of skipping the defect area in the write-once recording medium according to the present invention.

FIG. 5 illustrates a data recording method of skipping the defect area in the write-once recording medium (i.e., the write-once high density optical disc) according to the present invention. Referring to FIG. 5, when using the write-once high density optical disc, in order to facilitate the recording of a specific set of data on a predetermined area, the optical disc is sectioned to a plurality of consecutive areas, in which recording of data is proceeded. The above-described method is referred to as the sequential recording mode (SRM), and each of the sectioned areas for performing the sequential recording is referred to as a sequential recording range (SRR). In the sequential recording range (SRR), sequential recording of the data is performed sequentially in an increasing direction (or ascending power) of the address.

Among the SRRs, a recordable area that is able to create a next writable address (hereinafter referred to as "NWA") is specifically called an open SRR. And, a maximum of 16 open SRRs may be included in the optical disc. Therefore, as shown in FIG. 5, the data (file stream or files) is sequentially recorded in the allocated open SRR, and, in some cases, such recording maybe performed partially in a single SRR. More specifically, in the single SRR, the recording of data is performed in continuation starting from the area subsequent to a last recorded user data address (hereinafter referred to as a "LRA") of a previous recording area.

When a defect area is detected while recording data using the above-described method and the non real-time recording method, the position of the defect area is first verified by a write-and-verify method. Thereafter, a next record starting position (N) is decided in the file system area, and so the optical disc drive performs recording starting from the next record starting position (N), after skipping the defect area. In case of a single cluster, the information on the defect area is recorded in the TDMA as the NRD type TDFL information, and in case of multiple consecutive clusters, the information on the defect area is recording in the TDMA as the CND type TDFL information. However, when the CND type is not used, recording may be performed by using a plurality of NRD types.

On the other hand, when a defect area is detected while recording data using the real-time recording method, the optical disc drive arbitrarily decides a next record starting position (N) and records the data thereon. More specifically, when using the real-time recording method, since the optical recording system does not have sufficient time to check the range of the defect area, it is preferable to decide a width of the area that is to be skipped as a setting on the optical disc drive, thereby performing the data recording. Therefore, a relatively broad area range is skipped in order to find a safe recordable area, and the next record starting position (N) is reported to the file system area.

In the real-time recording method, the information on the defect area is registered either as the NRD type or as the CND type, as described in the non real-time recording method. However, since a relatively broad area range is skipped, the information is generally registered (or recorded) as the CND type. (Evidently, the information may also be registered (or recorded) as a plurality of NRD types, as described above). Additionally, since it is difficult to record information on the defect area in the TDMA during the real-time recording, the information is temporarily recorded in a memory of the recording system. Then, after the recording of the data is completed, the temporarily recorded information is recorded into the TDMA. Meanwhile, when using the sequential recording mode (SRM), which is one of the recording methods of the write-once high density optical disc, the data is recorded by allocating a plurality of sequential recording ranges (SRRs) within a single optical disc. Therefore, when recording data using the skip writing method, the recording of data may be disturbed by other SRRs having consecutive clusters. This will be described in detail with reference to FIG. 6.

Figure 6:
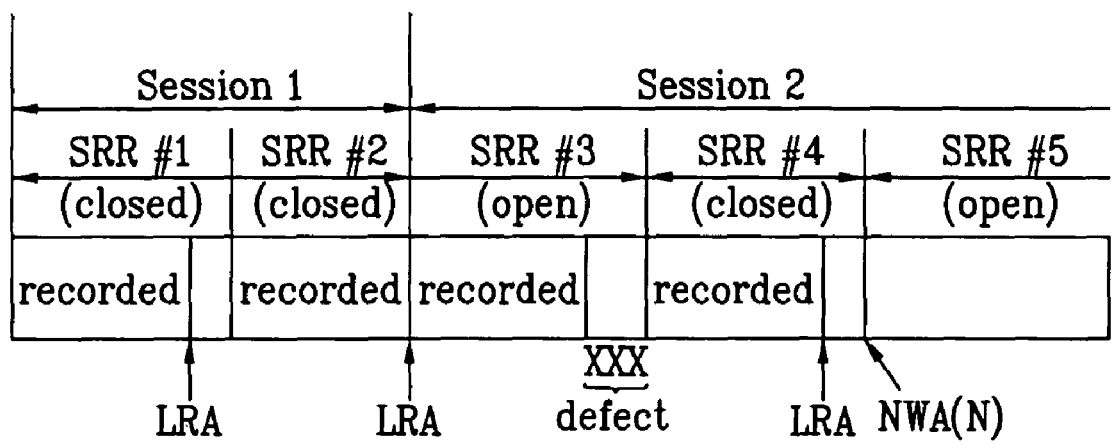
FIG. 6 illustrates another data recording method of skipping the defect area in the write-once recording medium according to the present invention.

FIG. 6 illustrates another data recording method of skipping the defect area in the write-once recording medium according to the present invention. First of all, the SRM recording method will be described in detail, in order to describe the instance of the recording process being disturbed by another SRR, when data is recorded by using the skip writing method in a single SRR. Referring to FIG. 6, a plurality of sequential recording ranges (SRRs) may be allocated in a single disc. In order to distinguish each of the plurality of SRRs, each SRR is numbered by an increasing order starting from the starting address. Therefore, numbering begins sequentially starting from SRR #1 up to SRR #N, when a total of N number of SRRs exists.

Accordingly, among the plurality of SRRs, a group of consecutive SRRs is referred to as a session, and each session is also numbered by an increasing order. At this point, the recordable SRR is referred to as an "open SRR", and the SRR whereby recording is completed or data can no longer be performed is referred to as a "closed SRR", as described above. Accordingly, in order to change an open SRR to a closed SRR, the number corresponding to the open SRR that is intended to be changed to the closed SRR is deleted from a plurality of open SRR numbers included in a "List of Open SRR Numbers" field from a sequential recording range information (SRRI), wherein SRM information is recorded.

In the above-described SRM recording method, as shown in FIG. 6, when a defect area is detected in an open SRR #3, which is the area currently being recorded, and when data recording is to be performed by using a skip writing method, once the defect area is skipped, data recording may not be easily performed due to a next closed SRR #4, in which data is recorded. (However, data does not necessarily have to be recorded herein.) In this case, the file system or the drive closes the current open SRR #3, and performs recording of the data corresponding to a next open SRR #5. When performing such data recording, the file system should be aware (or informed) of the recording start position (N) of the skipped area, as described above.

Figure 7:
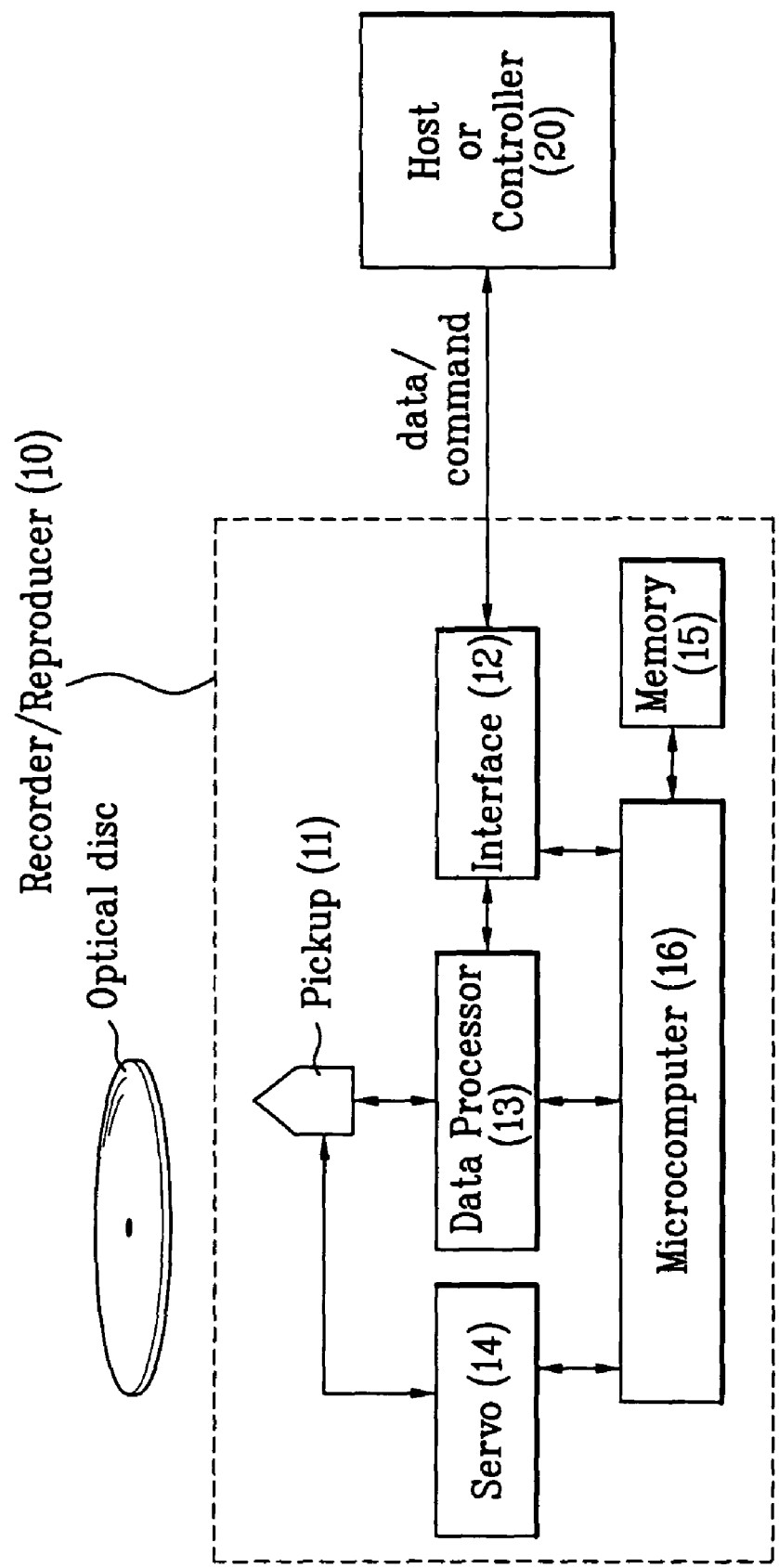
FIG. 7 illustrates an optical recording and reproducing apparatus according to the present invention.

FIG. 7 illustrates a block diagram of an optical recording and reproducing apparatus according to the present invention. Referring to FIG. 7, the optical recording and reproducing apparatus includes a recording/reproducing device 10 performing recording and/or reproducing on/from the optical disc, and a host (or controller) 20 controlling the recording/reproducing device 10. (Herein, the recording/reproducing device 10 is also referred to as an "optical disc drive", and both terms may be equally used in the description of the present invention.) More specifically, the host 20 transmits a request (or command) to the recording/reproducing device 10 to record or reproduce data to/from a specific area. Subsequently, the recording/reproducing device 10 operates, so as to perform recording and/or reproducing to/from the specific area in accordance with the command of the host 20.

Herein, the optical recording and/or reproducing apparatus 10 basically includes an interface unit 12 performing communicative operations with the host 20, such as transmitting and receiving data and commands, a pick-up unit 11 for directly recording data on the optical disc or directly reading the data from the optical disc, a data processor 13 either receiving the signals read from the pick-up unit 11 to a desired signal value, or modulating a signal to be recorded to an optical disc recordable signal and transmitting the modulated signal, a servo 14 controlling the operations of the pick-up unit 11, so as to accurately read the signals from the optical disc or to accurately record the signals on the optical disc, a memory 15 temporarily storing diverse information including management information and data, and a microcomputer 16 controlling the operations of the components included in the recording/reproducing device 10.

The process of recording data on the write-once high density optical disc according to the present invention by using the above-described optical recording and/or reproducing apparatus will now be described in detail. When an optical disc is first inserted into the optical recording and/or reproducing apparatus, all of the management information within the optical disc is read and recorded into the memory of the recording/reproducing device 10. Thereafter, the management information is used when recording and/or reproducing the optical disc. At this point, when the user wishes to record data in a specific area of the optical disc by using the SRM recording method, the host 20 transmits such user's desire as a recording (or writing) command to the recording/reproducing device 10 along with the data, wherein information of a position in which the user wishes to record data is recorded.

When the recording command whishes the data to be recorded in non real-time, the microcomputer 16 within the recording/reproducing device 10 receives the recording (or writing) command. Then, the microcomputer 16 determines from the management information stored in the memory 15, whether the area in which the controller 20 wishes to record data is a defect area or not, and whether data recording is completed. Then, the microcomputer 16 performs recording by using a write-and-verify method in an area that is neither a defect area nor a recording-completed area, in accordance with the recording command received from the controller 20.

During such data recording process, when a new defect area is detected, the data that is to be recorded on the new defect area may be replacement recorded in a spare area. Alternatively, when the spare area is insufficient, or when the spare area is not allocated, or when replacement recording is prohibited due to settings on the recording/reproducing device 10, data recording is performed by using a skip writing method, whereby the defect area is skipped. After performing replacement recording or skip writing, the related information is recorded in the TDMA of the optical disc as the TDFL information. At this point, the microcomputer 16 transmits the position information of the replacement recorded area or defect area and the data to the servo 14 and the data processor 13, so as to complete recording or replacement recording on the desired position of the optical disc through the pickup unit 11.

Furthermore, when the user wishes to record data in real-time, such as in broadcast program recording, and when the command transmitted from the host 20 requests real-time recording, the microcomputer 16 included in the recording/reproducing device 10 receives the recording (or writing) command. Then, the microcomputer 16 determines from the management information stored in the memory 15, whether the area in which the controller 20 wishes to record data is a defect area or not, and whether data recording is completed. Then, the microcomputer 16 performs real-time recording in an area that is neither a defect area nor a recording-completed area, in accordance with the recording command received from the controller 20.

During such data recording process, when a new defect area is detected, the recording/reproducing device 10 records data by using a skip writing method, whereby the defect area is skipped. After performing skip writing, the related information, such as the position information of the skipped area or location, is temporarily stored in the memory 15 of the recording/reproducing device 10, and then the temporarily stored related data is recorded in the TDMA of the optical disc as the TDFL information. At this point, the microcomputer 16 transmits the position information of the skipped area and the data to the servo 14 and the data processor 13, so as to complete recording or replacement recording on the desired position of the optical disc through the pickup unit 11.

As described above, the method and apparatus for recording data on the write-once high density optical disc according to the present invention have the following advantages. By categorizing the data recording method into real-time recording and non real-time recording, and by proposing an effective data recording method for each of the real-time recording and the non real-time recording, the write-once optical disc may be managed with more efficiency and data may be efficiently recorded on the optical disc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for managing a defect area detected while recording data on a write-once recording medium, the recording medium having a data zone and a non-data zone, the data zone having inner and outer spare areas and a user data area, the method comprising:

when data is recorded in non real-time, performing one of a first skip replacement and a linear replacement, the first skip replacement skips the defect area and continuously records data starting from a cluster subsequent to the defect area and the linear replacement replaces the defect area with a replacement area of the spare area, and recording defect management information including position information of the defect area and position information of the replacement area onto temporary management areas allocated to the non-data zone and the inner and outer spare areas, two of the temporary management areas being located on an inner side of the inner spare area and an outer side of the outer spare area, respectively, wherein the defect management information of the linear replacement is recorded as a re-allocatable defect (RAD) type if the defect area is a single cluster, and recorded as a consecutive re-allocatable defect (CRD) type if the defect area is a plurality of consecutive clusters, and the defect management information of the first skip replacement is recorded as a non-reallocatable defect (NRD) type if the defect area is a single cluster, and recorded as a consecutive non-reallocatable defect (CND) type if the defect area is a plurality of consecutive clusters; and when data is recorded in real-time, performing one of a second skip replacement and a stream recording, the second skip replacement skips multiple consecutive clusters and records data starting from a cluster subsequent to the multiple consecutive clusters, and the stream recording ignores the defect area and records data continuously on the defect area without an allocation of a replacement area, wherein the second skip replacement further includes recording defect management information including position information of the defect area onto the temporary management area, wherein the defect management information of the second skip replacement is recorded as a consecutive non-reallocatable defect (CND) type.

2. The method of claim 1, wherein, in the second skip replacement, the number of clusters to be skipped is set to a relatively large area.

3. The method of claim 1, further comprising:
allocating the temporary management area of a predetermined size to the non-data zone; and
allocating the temporary management areas of a non-predetermined size of between 0 and a predetermined maximum value, to the inner and outer spare areas, respectively.

4. An apparatus for managing a defect area detected while recording data on a write-once recording medium, the recording medium having a data zone and a non-data zone, the data zone having inner and outer spare areas and a user data area, the apparatus comprising:
a pick-up configured to directly record data on the recording medium;
a servo configured to control operation of the pick-up so as to record a signal on the recording medium;
a data processor configured to modulate a signal to be recorded to the recording medium; and
a microcomputer configured to control the pick-up, the servo and the data processor such that when data is recorded in non real-time, one of a first skip replacement and a linear replacement is performed so that the first skip replacement skips the defect area and continuously records data starting from a cluster subsequent to the defect area and the linear replacement replaces the defect area with a replacement area of the spare area, and records defect management information having position information of the defect area and position information of the replacement area recorded onto temporary management areas allocated to the non-data zone and the inner and outer spare areas, two of the temporary management areas being located on an inner side of the inner spare area and an outer side of the outer spare area, respectively, wherein the defect management information of the linear replacement is recorded as a re-allocatable defect (RAD) type if the defect area is a single cluster, and recorded as a consecutive re-allocatable defect (CRD) type if the defect area is a plurality of consecutive clusters, and the defect management information of the first skip replacement is recorded as a non-reallocatable defect (NRD) type if the defect area is a single cluster, and recorded as a consecutive non-reallocatable defect (CND) type if the defect area is a plurality of consecutive clusters; and
when data is recorded in real-time, one of a second skip replacement and a stream recording is performed, the second skip replacement skips multiple consecutive clusters and records data starting from a cluster subsequent to the multiple consecutive clusters, and the stream recording ignores the defect area and records data continuously on the defect area without an allocation of a replacement area, wherein the second skip replacement further includes recording defect management information having position information of the defect area onto the temporary management area, wherein the defect management information of the second skip replacement is recorded as a consecutive non-reallocatable defect (CND) type.

5. The apparatus of claim 4, wherein in the second skip replacement, the number of clusters to be skipped is set to a relatively large area.

6. A method for managing a defective area in a recording medium, the recording medium having a data zone and a non-data zone, the data zone having inner and outer spare areas and a user data area, the method comprising:
writing data according to whether the data is real-time data or non real-time data, wherein the data is written in a replacement area of the spare area in place of the defective area if the data is the non real-time data, and wherein the defective area is skipped and the data is written starting from a next available area of the user data area if the data is the real-time data; and
recording defect management information in one of defect management areas within the inner and outer spare areas in response to the writing, the defect management areas being located on an inner side of the inner spare area and an outer side of the outer spare area, respectively, wherein the defect management information includes first position information for specifying a position of the defective area, second position information for specifying a position of the replacement area and status information for indicating whether the defective area is a single cluster or multiple consecutive clusters and whether the defective area is replaced with the replacement area or not,
wherein the defect management areas are used one by one in a designated order to record the defect management information, and
wherein other defect management area is not used until one of the defect management areas is full.

7. The method of claim 6, wherein if the data is the real-time data, the first position information specifies the position of the defective area, the second position information specifies no position of replacement area and the status information indicates that the defective area is not replaced with the replacement area.

8. The method of claim 6, wherein if the data is the non real-time data, the first position information specifies the position of the defective area, the second position information specifies the position of the corresponding replacement area and the status information indicates that the defective area is replaced with the replacement area.

9. The method of claim 6, further comprising:
allocating the defect management area of a predetermined size to the inner side of the inner spare area; and
allocating the defect management area of a non-predetermined size of between 0 and a predetermined maximum value to the outer side of the outer spare area.

10. An apparatus for managing a defective area in a recording medium, the recording medium having a data zone and a non-data zone, the data zone having inner and outer spare areas and a user data area, the apparatus comprising:
a pickup configured to read/write data from/on the recording medium; and
a controller operably connected to the pickup and configured to control the pickup to write data according to whether the data is real-time data or non real-time data, wherein the controller is configured to control the pickup to write the data in a replacement area of the spare area in place of the defective area if the data is the non real-time data, and wherein the controller is configured to control the pickup to skip the defective area and to write the data starting from a next available area of the user data area if the data is the real-time data, and the controller configured to control the pickup to record defect management information in one of defect management areas within the inner and outer spare areas in response to the writing of the data, the defect management areas being located on an inner side of the inner spare area and an outer side of the outer spare area, respectively, wherein the defect management information includes first position information for specifying a position of the defective area, second position information for specifying a position of the replacement area and status information for indicating whether the defective area is a single cluster or multiple consecutive clusters and whether the defective area is replaced with the replacement area or not, wherein the defect management areas are used one by one in a designated order to record the defect management information, and wherein other defect management area is not used until one of the defect management areas is full.

11. The apparatus of claim 10, wherein the controller is configured to control the pickup to allocate the defect management area of a predetermined size to the inner side of the inner spare area and allocate the defect management area of a non-predetermined size of between 0 and a predetermined maximum value to the outer side of the outer spare area.

* * * * *